G. CROSBY.
DYNAMO MOUNTING.
APPLICATION FILED MAY 18, 1915.
1,242,528.
Patented Oct. 9, 1917.
3 SHEETS—SHEET 1.
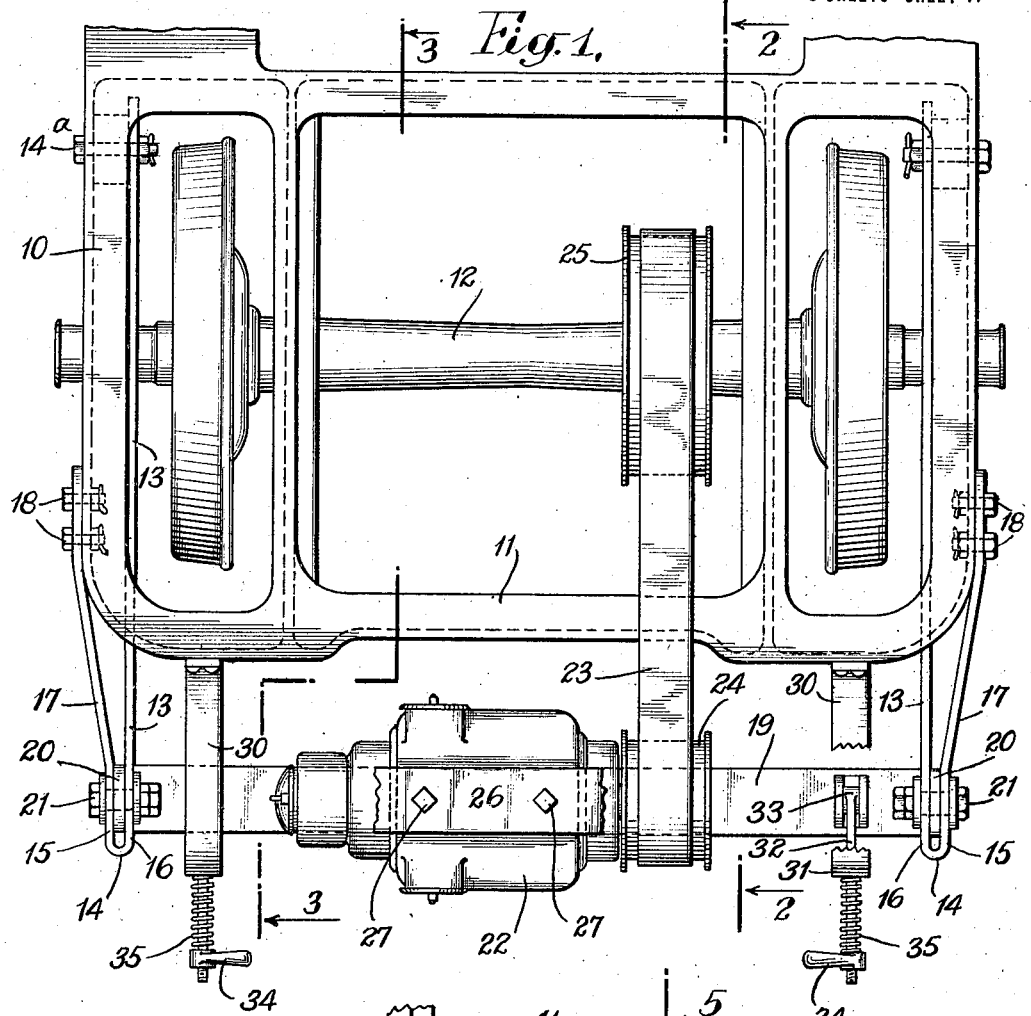
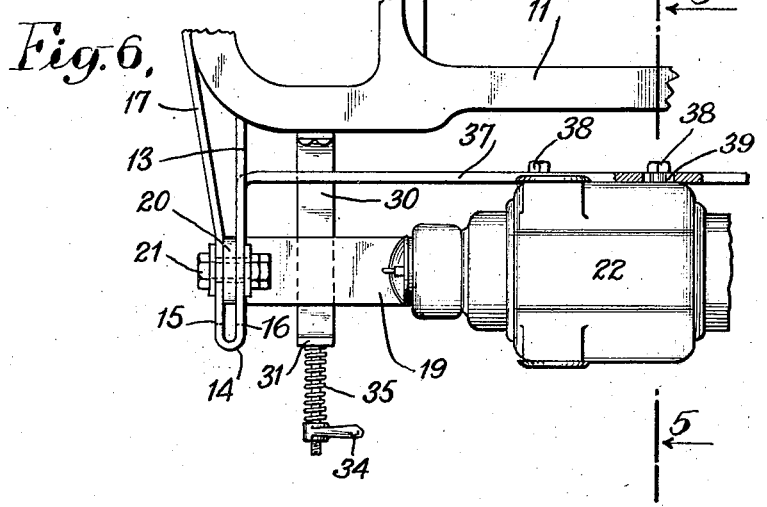
INVENTOR
Gorham Crosby
BY
Kenyon & Kenyon
ATTORNEYS

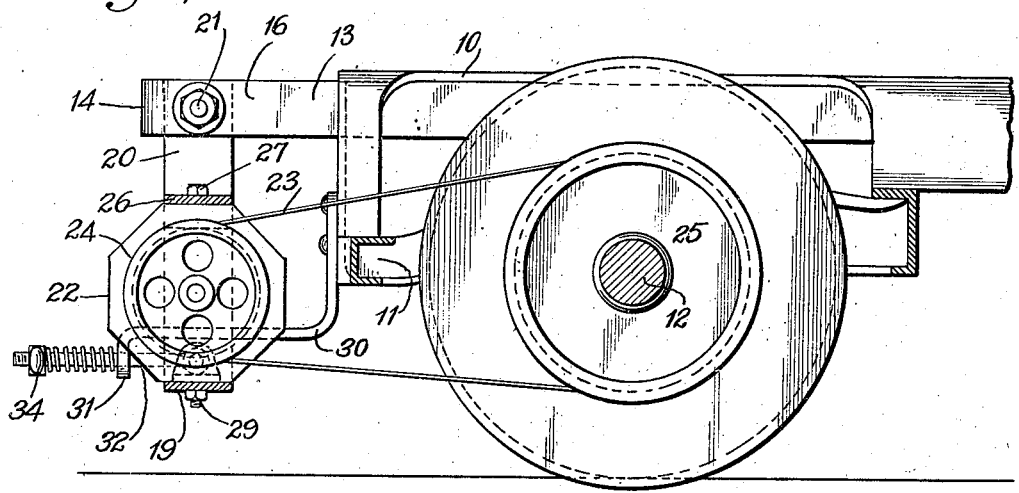
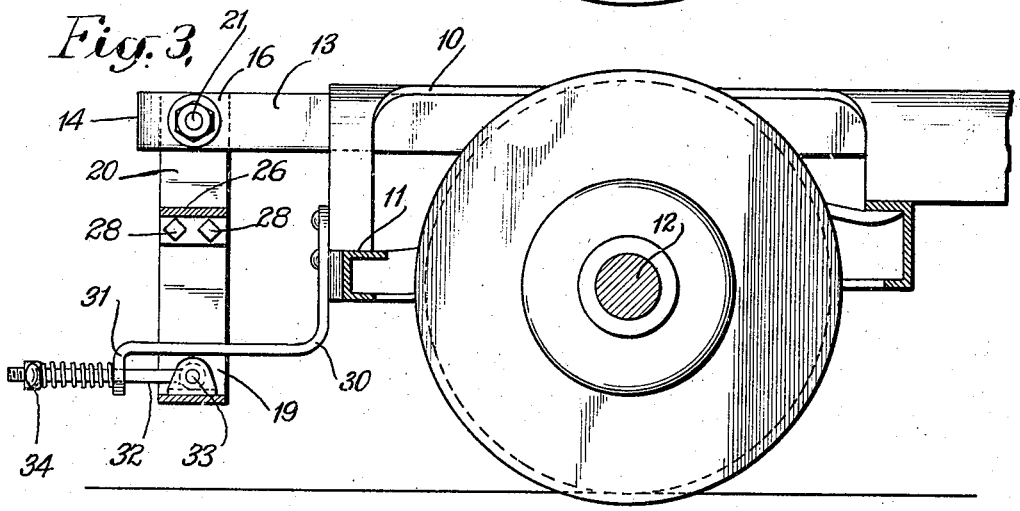
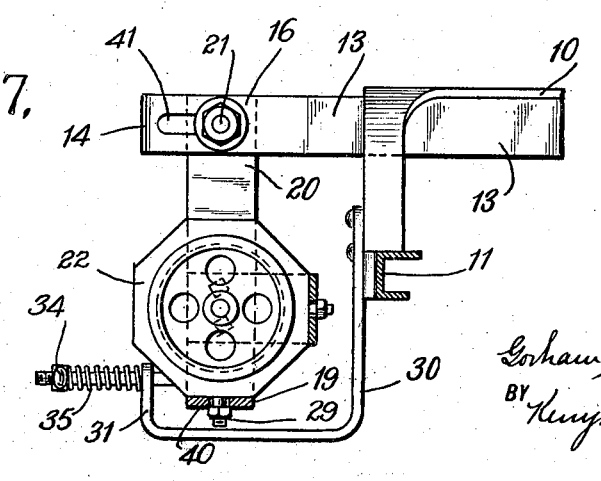

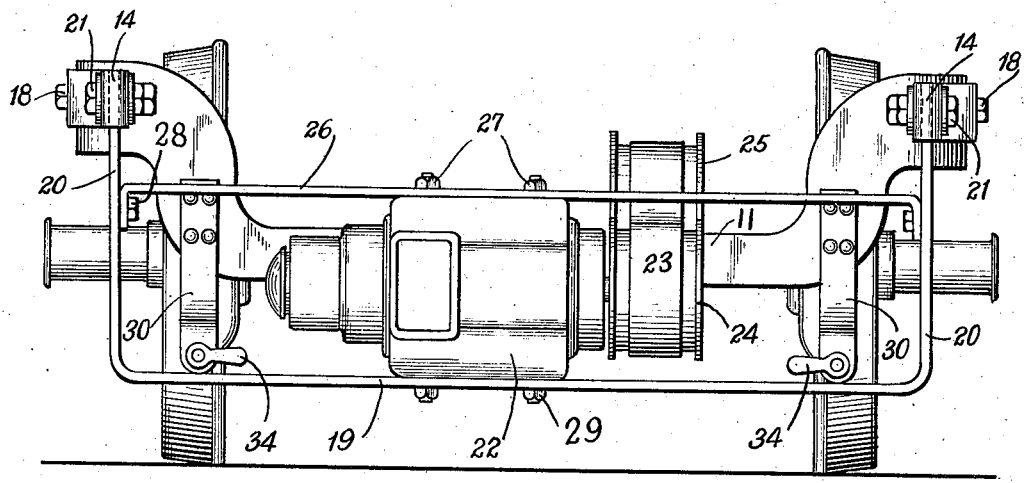
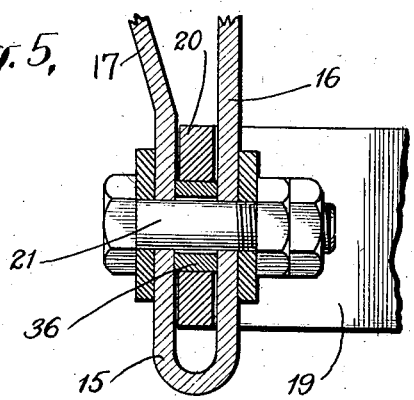

UNITED STATES PATENT OFFICE.

GORHAM CROSBY, OF GLEN RIDGE, NEW JERSEY, ASSIGNOR TO GOULD COUPLER COMPANY, A CORPORATION OF NEW YORK.

DYNAMO-MOUNTING.

1,242,528.      Specification of Letters Patent.      Patented Oct. 9, 1917.

Application filed May 18, 1915. Serial No. 28,824.

*To all whom it may concern:*

Be it known that I, GORHAM CROSBY, a citizen of the United States, and a resident of Glen Ridge, county of Essex, State of New Jersey, have invented certain new and useful Improvements in Dynamo-Mountings, of which the following is a specification.

My invention relates to improvements in dynamo mounting, and more particularly to a supporting arrangement for dynamo electric machines adapted to be driven from a car axle. One object of my invention is to provide a construction such that the dynamo will not only be easily accessible and such that it will not interfere with the sills of the car, but more particularly a construction which is easily and cheaply made, and contains but few parts which are simple and easily assembled. A further object of my invention is to provide a construction which is not only simple and efficient, but is strong and durable and not likely to get out of order. Further objects, features and advantages will more clearly appear from the detailed description given below, taken in connection with the accompanying drawings, which form a part of this specification.

In the drawings Figure 1 is a plan view, showing part of a car truck with the supporting arrangement embodying one form of my invention applied thereto. Fig. 2 is a section taken on the line 2—2 of Fig. 1. Fig. 3 is a section taken on the line 3—3 of Fig. 1. Fig. 4 is a front view of the apparatus shown in Fig. 1. Fig. 5 is a detail showing the pivoting arrangement. Fig. 6 is a fragmentary plan view, illustrating a modification and Fig. 7 is a section taken on the line 5—5 of Fig. 6.

Referring to Figs. 1 to 5, 10 represents a car truck of any suitable kind, preferably having its cross members depressed as at 11, to accommodate the center sills of the car. 12 represents one of the car axles. Secured to the car truck 10 are substantially parallel supporting bars 13, being bolted thereto at their inner ends by bolts 14ª and passing through slots in the front of the truck frame. Bars 13 extend horizontally from the car truck 10 and are bent back at their outer ends at 14, so as to form two parallel supporting parts 15 and 16. The bent back part 17 of each bar is secured to the truck by means of bolts 18, so that it forms a lateral brace for the supporting bars. 19 represents a U-shaped member, having one of its upper ends 20 passing between the supporting parts 15 and 16 of one of the bars 13 and the other of its upper ends 20 passing between the supporting parts of the other bar 13. Bolts 21 pass through the supporting parts 15 and 16 and the upper ends 20 of the U-shaped member 19, so that the U-shaped member is pivotally supported from the supporting bars 13. Carried upon the U-shaped member 19 is a dynamo electric machine 22, adapted to be driven from the axle 12 by means of a belt 23 passing over a dynamo pulley 24 and pulley 25 on the axle 12. The U-shaped member 19 is arranged substantially parallel to the car axle and the dynamo 22 is arranged with its center of gravity normally over the center line of said U-shaped member 19, so that there is no tendency for the dynamo to swing, due to its weight, when the parts are in normal position. To hold the dynamo securely on the U-shaped member, a cross-brace 26 is provided, which is secured to the dynamo by bolts 27, the brace member 26 passing horizontally over the top of the dynamo and having its ends secured to the upright portions 20 of the U-shaped member 19 by means of bolts 28 (see Fig. 3). The dynamo 22 is secured to the bottom of the U-shaped member 19 by means of bolts 29, passing through the member 19.

In order to keep a proper tension on belt 23, I provide two members 30, each secured to the truck frame, one on each side of the truck or in any other suitable position, independently of the supporting bars 13, said members extending forward over the bottom of the U-shaped member 19, and then being bent downwardly at 31, each being provided with an aperture through which passes a rod 32, pivotally secured at one end of the U-shaped member 19 at 33. Rods 32 are threaded at their outer ends and provided with hand nuts 34, adapted to compress springs 35, surrounding the rods 32, the inner ends of which springs abut against the portions 31 of the members 30, so that these springs tend to rotate the U-shaped member 19 and the dynamo carried thereby, outwardly or away from the car axle and truck, in order to apply the proper tension to the belt 23.

The pivoting bolts 21 are surrounded by bearing collars 36 between the supporting parts 15 and 16, which collars are of greater length than the thickness of the upright supporting parts 20 of the U-shaped member 19, so that the parts 20 are spaced away from the supporting parts 15 and 16 (see Fig. 5).

In the modification shown in Figs. 6 and 7, the structure is the same except, instead of providing bracing bar 26 passing over the top of the generator, a bar 37 is provided which likewise has its ends bolted onto the upright portions of the U-shaped member 19, but which passes along the back of the generator and is secured thereto by means of bolts 38. Bar 37 may be slotted where the bolts 38 pass therethrough, as shown at 39, and also the member 19 may be slotted where the bolts 29 pass therethrough, as shown at 40 (see Fig. 7), so that upon loosening the bolts 38 and 29, the dynamo may be given a lateral adjustment along the supporting U-shaped member 19.

Also in Fig. 7 I have shown the supporting bars 13 slotted at their outer ends, as at 41, so that the pivoting bolts 21 may be adjusted longitudinally toward and away from the axle, in order that the supporting U-shaped member 19 and dynamo carried thereby, may be bodily adjusted toward and away from the car axle. In Figs. 6 and 7, the members 30 are shown as extending under the member 19 instead of over, and the ends 31 thereof being bent upwardly, instead of downwardly.

While I have described my invention with respect to preferred embodiments thereof, I do not desire to be limited to the details shown and described, as many changes and modifications may well be made without departing from the spirit and scope of my invention in its broader aspects.

What I claim as new and desire to secure by Letters Patent of the United States is:—

1. Means for supporting a dynamo electric machine from a car truck, having in combination two supporting bars extending horizontally from said truck, said bars being bent back at their outer ends, whereby each bar forms two supporting parts, one part being inclined with respect to the other, to form a lateral brace, a dynamo electric machine, means for supporting said dynamo electric machine, said means having a portion at one end extending between the supporting parts of one bar and pivoted with respect thereto, and said means having a part at the other end extending between the supporting parts of the other bar and pivoted with respect thereto and driving means between the dynamo electric machine and car axle.

2. Means for supporting a dynamo electric machine from a car truck, having in combination two supporting bars extending horizontally from the car truck, each of said bars being bent back at their outer ends and secured to the truck to form a lateral brace for the bar, and means for pivotally supporting the dynamo electric machine from the outer ends of said bars.

3. Means for supporting a dynamo electric machine from a car truck, having in combination parallel supporting bars extending from the car truck, said bars being bent back at their outer ends, whereby each bar forms two supporting parts, the bent back part being secured to the truck, a member having one end extending between the supporting parts of one bar and pivoted with respect thereto, and its other end extending between the supporting parts of the other bar and pivoted with respect thereto and a dynamo electric machine rigidly carried on said member.

4. Means for supporting a dynamo electric machine from a car truck, having in combination supporting bars extending outside of the car truck each having two supporting parts, means for pivotally supporting the dynamo electric machine with respect to said bars, driving means connecting the dynamo electric machine to the car axle, means secured to the car truck independently of said supporting bars and extending forward of the truck, and spring tensioning means coöperating with said last mentioned means, tending to move the dynamo electric machine away from the car axle and truck.

5. Means for supporting a dynamo electric machine from a car truck, having in combination supporting bars extending horizontally from said truck adjacent the top of the truck, each having two supporting parts, a swinging member for pivotally supporting the dynamo electric machine from said bars outside of the truck, members bolted to said truck and extending forward of the dynamo electric machine, and spring tensioning means carried by said members, and tending to move the dynamo electric machine away from the truck.

6. Means for supporting a dynamo electric machine from a car truck, having in combination supporting bars extending horizontally from said truck, said bars being bent back at their outer ends to form two supporting parts, the bent back part being secured to the truck, a member having one end extending between the supporting parts of one bar and pivoted with respect thereto and its other end extending between the supporting parts of the other bar and pivoted with respect thereto, a dynamo electric machine carried on top of said member, a brace bar extending over the top of the dynamo electric machine and secured thereto and having its ends secured to the sides of said member, and means for driving said dynamo electric machine from the car axle.

7. Means for supporting a dynamo electric machine from a car truck, having in combination supporting bars extending horizontally from the car truck, a single swinging member having its upper ends pivoted with respect to said bars, a dynamo electric machine carried upon said swinging member, a brace bar extending over the top of the dynamo electric machine and secured thereto, and having its ends secured to the sides of said swinging member, the pivotal axis of said swinging member being above the top of the dynamo electric machine, and means for driving the dynamo electric machine from the car axle.

8. Means for supporting a dynamo electric machine from a car truck, having in combination supporting bars extending horizontally from the top of the truck, a U-shaped member pivotally supported from said bars, adjacent their outer ends, a dynamo electric machine carried upon said U-shaped member, means secured to said truck independently of said bars and extending forward of said U-shaped member, and spring tensioning means operatively connected with said last mentioned means, tending to force the dynamo away from the car truck and means for driving the dynamo electric machine from the car axle.

9. Means for supporting a dynamo electric machine from a car truck having in combination parallel supporting bars extending from the car truck adjacent the top thereof, a U-shaped member pivotally supported from said bars, a dynamo electric machine carried by said U-shaped member, spring tensioning means secured to and carried by the truck independently of said supporting bars and tending to force the dynamo electric machine away and from the truck and means for driving the dynamo electric machine from the car axle.

10. Means for supporting a dynamo electric machine from a car truck, having in combination supporting bars extending horizontally from the car truck, said bars being bent back at their outer ends and having the bent back portions secured to the car truck, whereby each bar forms two supporting parts, means for supporting a dynamo electric machine, said means having a part extending between the supporting parts of one bar and another part extending between the supporting parts of the other bar, and pivot bolts passing through the supporting parts of said bars and the last mentioned parts of said dynamo supporting means, respectively, a collar surrounding each bolt between the supporting parts of the bars respectively, to space said parts away from the parts of the dynamo electric machine supporting means, which pass between the supporting parts of said bars, and means for driving the dynamo electric machine from the car axle.

11. Means for supporting a dynamo electric machine from a car truck, having in combination supporting bars extending horizontally from the truck, a U-shaped member having its ends pivotally connected to said bars, said U-shaped member lying substantially parallel to the car axle, a dynamo electric machine carried by said U-shaped member, means for driving the dynamo electric machine from the car axle, two members secured to the car truck, one at each side thereof and independently of said supporting bars, said members extending forward of said U-shaped member, and tensioning means coöperating with each of said last mentioned members, tending to swing the dynamo and U-shaped member away from the car truck.

12. Means for supporting a dynamo electric machine from a car truck, having in combination parallel supporting bars extending from the car truck, said bars being bent back at their outer ends, whereby each bar forms two supporting parts, the bent back part being secured to the truck to form a lateral brace, a single U-shaped member having one end extending between the supporting parts of one bar and pivoted thereto, and its other end extending between the supporting parts of the other bar and pivoted thereto, a dynamo electric machine rigidly secured on said U-shaped member and having its center of gravity directly normally over the same, a brace bar extending over the top of the dynamo electric machine and secured thereto and having its ends secured to the upright portions of said U-shaped member, a driving connection between said dynamo electric machine and the car axle, means secured to said truck and extending forward of said U-shaped member, and spring tensioning means connecting said means with U-shaped member.

13. Means for supporting a dynamo electric machine from a car truck, having in combination two supporting bars extending from the truck, each of said bars being bent back at its outer end and extending backwardly parallel to the outwardly extending part and thence laterally back to the car truck to form a lateral brace, and means for supporting a dynamo electric machine from said parallel parts of the bars.

14. Means for supporting a dynamo electric machine from a car truck having in combination two supporting bars extending from the truck, each of said bars having on its outer end a bent-back portion with a space between it and the other part of the bar and means whereby a dynamo electric machine is pivotally supported from both portions of each of said bars.

15. Means for supporting a dynamo electric machine from a car truck, having in combination parallel supporting bars extending from the car truck, said bars being bent back at their outer ends, whereby each bar forms two supporting parts, the bent back part being secured to the truck, a swinging member having one end extending between the supporting parts of one bar and pivoted with respect thereto, and its other end extending between the supporting parts of the other bar and pivoted with respect thereto and a dynamo electric machine rigidly carried on said swinging member.

16. Means for supporting a dynamo electric machine from a car truck, having in combination supporting bars extending horizontally from said truck, said bars being bent back at their outer ends to form two supporting parts, the bent back part being secured to the truck, a swinging member having one end extending between the supporting parts of one bar and pivoted with respect thereto and its other end extending between the supporting parts of the other bar and pivoted with respect thereto, a dynamo electric machine carried on top of said swinging member, a brace bar extending over the top of the dynamo electric machine and secured thereto and having its ends secured to the sides of said swinging member, and means for driving said dynamo electric machine from the car axle.

17. In an arrangement of the class described, in combination with a car truck, two bars extending outwardly from each side of the truck, said bars having spaced apart parallel portions outside of the truck, a swinging structure having its ends extending between said parallel portions respectively and pivoted with respect thereto, a dynamo carried by said swinging structure and means for driving said dynamo.

In testimony whereof, I have signed my name to this specification.

GORHAM CROSBY.

Copies of this patent may be obtained for five cents each, by addressing the "Commissioner of Patents, Washington, D. C."